July 19, 1966     H. MARKS     3,261,126
FLOWER MOUNTING SYSTEM
Filed Feb. 19, 1962
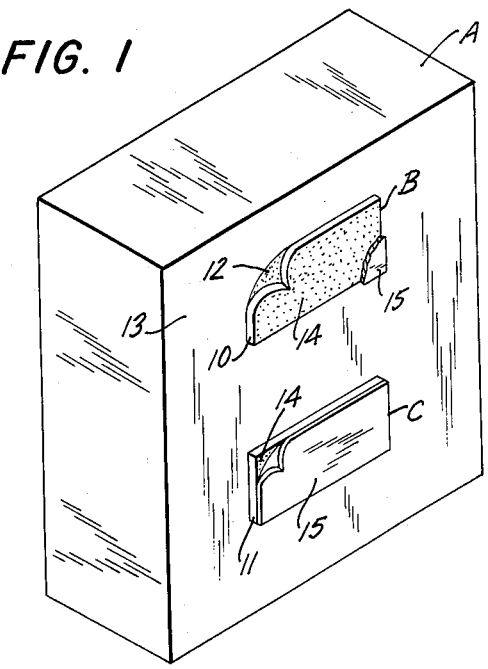
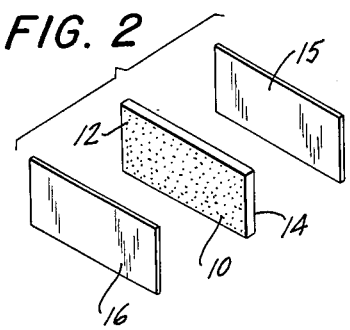
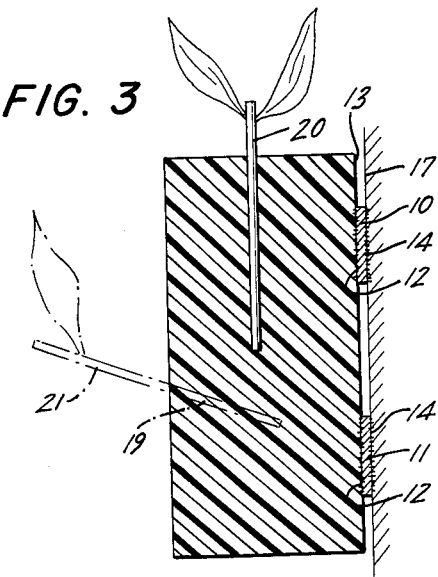
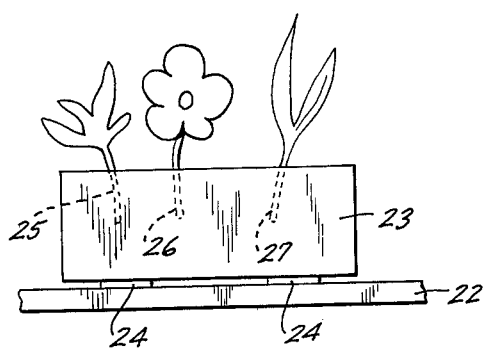
INVENTOR.
HAROLD MARKS
BY *Harry Price*
ATTORNEY

United States Patent Office 3,261,126
Patented July 19, 1966

3,261,126
FLOWER MOUNTING SYSTEM
Harold Marks, Flushing, N.Y., assignor to Modern Miltex Company, New York, N.Y., a corporation of New York
Filed Feb. 19, 1962, Ser. No. 174,204
1 Claim. (Cl. 47—41.12)

The present invention relates to a flower mounting system and it particularly relates to a system for mounting flowers in and around the house without instituting special expensive attachments and without requiring the use of special bowls or receptacles thereof.

Another object is to provide a novel flower mounting system which may be conveniently used in and around the house to mount flowers and other plants in predetermined positions on walls or in and about various living rooms of the household without requiring the use of special vases or flower receptacles Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to provide a readily attachable lightweight plastic material which will serve to carry the flower or plant and which at the same time may be readily attached to and removed from articles of furniture or walls without involving any special jars, vases or other containers or special attachments onto a wall or article of furniture, as the case may be.

The preferred material has been found to be a porous, expanded plastic material, and desirably a form sustaining material, such as expanded polystyrene, although other expanded resinous materials may be employed.

Desirably, the expanded polystyrene material may be made in various shapes, either square, polygonal, or even semispherical or other similar shapes.

In the preferred form of the invention, the polystyrene is made in the form of a block or cube, which may be readily mounted onto a wall by means of a pressure sensitive adhesive material.

The preferred pressure sensitive adhesive material may be of double face type, one face being provided with a release which is attached to and applied to the side or back of the mounting block and the other face of which may have a protective cover which may be removed at any time to permit the mounting block to be positioned on or against a wall or other suitable mounting point.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

FIG. 1 is a front perspective view of one form of mounting block with two attachment tabs associated therewith.

FIG. 2 shows the attachment tabs removed from the block and positioned by themselves for clearer illustration.

FIG. 3 is transverse sectional view, showing how the block of FIG. 1 may be attached to the wall with the adhesive attachment, holding it securely to the wall.

FIG. 4 is an alternative mounting, showing one of the blocks mounted upon a table or horizontal surface, as may also be readily accomplished.

Referring to FIG. 1, there is shown a block A of expanded polystyrene, which has attached to the rear thereof two mounting pads with protective coverings which may be readily removed in connection with the mounting of the block on a wall, table or other suitable carrying structure.

This block may take a wide variety of shapes and a rectangular block is merely one of the regular shapes that may be employed.

For example, it may consist of a half of a sphere or have a triangular shape with a flat rear mounting side, or it may have various other forms or structures.

The adhesive attachment elements B and C normally are of a soft, pliable rubber sponge material which has adhesive coverings on each side, but which adhesive coverings normally are protected by a readily removable cover sheet.

For example, as shown in FIG. 1, the mounting pads 10 and 11 may have pressure sensitive adhesive facings at 12 on the face against the face 13 of the block A and at 14 on the face which is to be used for mounting on a wall or article of furniture or some other mounting structure.

The foam rubber pads 10 and 11 will normally come to the user thereof covered by the protective sheets 15 and 16 and in FIG. 2 is shown a separated view with the pads 10 and the protective sheets 15 and 16 in their normal positions before they are associated with the pad.

To apply these attachment pads, the sheet 16 is first removed and the face 12 is then applied to the back face 13 of the block A.

Two of these attachment pads, as indicated at 10 and 11 in FIGS. 1 and 3, are necessary to attach the block to the wall and assure suitable support therefor.

When the block is to be attached to the wall then the other protective sheet 15 is removed and the adhesive coated surface 14 may be pushed directly against the wall with the adhesive surfaces 14 maintaining the attachment onto the wall 17, while the adhesive faces 12 maintain the attachment on the back face 13 of the block A.

To attach a flower in the block A, a puncture is made, as indicated at 19, and the stem 20 or 21 of the flower or plant is inserted, which will enable the flower or plant to be placed in position.

This opening may have therein sufficient excess space to receive a small amount of water which will maintain the flower or stem in fresh condition for a long period of time.

In the alternative form of the invention, as shown in FIG. 4, there is a table 22 to which the block 23 is attached by means of the pads 24 of the same type and construction as the pads 10 and 11 of FIGS. 1 and 3.

The block 23 may be punctured in several places, as indicated at 25, 26 and 27, for insertion of the stems, which punctures or recesses may also have sufficient additional space therein to permit or some preserving compound to be inserted to help keep the flowers fresher for a longer period of time.

It is thus apparent that the applicant has provided a novel flower mounting system, which can be widely used in the mounting, display and care of flowers in and around the household.

As many changes could be made in the above flower mounting system and as many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

In combination a porous, rigid resinous block for mounting artificial flowers attached to a flat surface by means of a pressure-sensitive adhesive porous plastic pad having a strong, adherent, tenacious pressure-sensitive adhesive on both sides of said pad, said adhesive being nonsolvent with respect to and compatible with the material of the block and of sufficient strength to withstand and resist torsion stresses from the mounted flowers.

References Cited by the Examiner

UNITED STATES PATENTS

| | | |
|---|---|---|
| 1,875,766 | 9/1932 | Shubert. |
| 2,030,135 | 2/1936 | Carpenter. |
| 2,599,359 | 6/1952 | Banks et al. |
| 2,737,746 | 3/1956 | Orr _____ 161—27 |
| 2,971,292 | 2/1961 | Malecki. |
| 2,994,985 | 8/1961 | Jackson. |

ALEXANDER WYMAN, *Primary Examiner.*

JACOB STEINBERG, *Examiner.*